United States Patent
Reunamaki et al.

(10) Patent No.: US 11,543,487 B2
(45) Date of Patent: Jan. 3, 2023

(54) CAUSING PERFORMANCE OF AN ACTIVE SCAN

(71) Applicant: Nokia Technologies Oy, Espoo (FI)

(72) Inventors: Jukka Reunamaki, Tampere (FI); Oskari Koskimies, Helsinki (FI)

(73) Assignee: Nokia Technologies OY, Espoo (FI)

( * ) Notice: Subject to any disclaimer, the term of this patent is extended or adjusted under 35 U.S.C. 154(b) by 340 days.

(21) Appl. No.: 15/580,607

(22) PCT Filed: Jun. 9, 2015

(86) PCT No.: PCT/FI2015/050401
§ 371 (c)(1),
(2) Date: Dec. 7, 2017

(87) PCT Pub. No.: WO2016/198723
PCT Pub. Date: Dec. 15, 2016

(65) Prior Publication Data
US 2018/0164399 A1     Jun. 14, 2018

(51) Int. Cl.
| | |
|---|---|
| G01S 5/02 | (2010.01) |
| G06F 3/01 | (2006.01) |
| G01S 3/14 | (2006.01) |
| G01S 3/04 | (2006.01) |
| G06K 7/10 | (2006.01) |
| H04L 9/40 | (2022.01) |

(52) U.S. Cl.
CPC ............ *G01S 5/0247* (2013.01); *G01S 3/043* (2013.01); *G01S 3/14* (2013.01); *G06F 3/013* (2013.01); *G06F 3/017* (2013.01); *G06K 7/10118* (2013.01); *H04L 63/101* (2013.01)

(58) Field of Classification Search
CPC ......... G06F 3/013; G01S 3/043; G01S 5/0247
USPC .......................................................... 702/150
See application file for complete search history.

(56) References Cited

U.S. PATENT DOCUMENTS

| | | | |
|---|---|---|---|
| 8,913,955 | B1 | 12/2014 | Mincher |
| 8,924,155 | B2 | 12/2014 | Waters et al. |
| 2001/0036832 | A1* | 11/2001 | McKay ................. G01S 5/0027 455/457 |

(Continued)

FOREIGN PATENT DOCUMENTS

| | | |
|---|---|---|
| CN | 101385382 A | 3/2009 |
| CN | 103999511 A | 8/2014 |

(Continued)

OTHER PUBLICATIONS

WO 2015/067982 AI (Year: 2015).*

(Continued)

*Primary Examiner* — Eman A Alkafawi
(74) *Attorney, Agent, or Firm* — Locke Lord LLP

(57) ABSTRACT

This specification describes a method comprising determining an orientation of a first apparatus with respect to a second apparatus (S6.2) based on at least one radio frequency packet passed wirelessly between the first and second apparatuses, and causing performance of an active scan for the second apparatus or a third apparatus associated with the second apparatus (S6.5) only if it is determined that the orientation of the first apparatus with respect to the second apparatus satisfies at least one predetermined condition (S6.3).

16 Claims, 7 Drawing Sheets

(56) References Cited

U.S. PATENT DOCUMENTS

| | | | |
|---|---|---|---|
| 2004/0193413 A1* | 9/2004 | Wilson | G06F 3/017 704/243 |
| 2011/0314168 A1 | 12/2011 | Bathiche et al. | |
| 2012/0082039 A1 | 4/2012 | Li et al. | |
| 2012/0257604 A1 | 10/2012 | Honkanen et al. | |
| 2013/0083063 A1* | 4/2013 | Geisner | G09G 5/363 345/633 |
| 2013/0188538 A1 | 7/2013 | Kainulainen et al. | |
| 2013/0254716 A1* | 9/2013 | Mishra | G06Q 30/02 715/810 |
| 2014/0056177 A1 | 2/2014 | Kneckt et al. | |
| 2014/0361956 A1* | 12/2014 | Mikhailov | G02B 27/0179 345/8 |
| 2016/0103484 A1* | 4/2016 | Guo | A61B 3/113 345/156 |

FOREIGN PATENT DOCUMENTS

| | | |
|---|---|---|
| CN | 104219784 A | 12/2014 |
| WO | 2014/035231 A1 | 3/2014 |
| WO | 2014/099479 A1 | 6/2014 |
| WO | 2014177909 | 11/2014 |
| WO | 2015067982 | 5/2015 |
| WO | 2016/005649 A1 | 1/2016 |

OTHER PUBLICATIONS

International Search Report and Written Opinion received for corresponding Patent Cooperation Treaty Application No. PCT/FI2015/050401, dated Oct. 9, 2015, 22 pages.

"Bluetooth Specification Version 4.0", Specification of the Bluetooth System, Jun. 30, 2010, 2302 pages.

"New Alliance helps you find 'needle in a haystack'", Microsoft, Retrieved on Jan. 31, 2019, Webpage available at : http://blogs.windows.com/devices/2012/08/23/new-alliance-helps-you-find-needle-in-a-haystack/.

Filonenko et al., "Indoor Positioning for Smartphones Using Asynchronous Ultrasound Trilateration", ISPRS International Journal of Geo-Information, vol. 2, No. 3, 2013, pp. 598-620.

"Ten Things You Need to Know About Indoor Positioning", Directionsmag, Retrieved on Jan. 10, 2019, Webpage available at : https://www.directionsmag.com/article/1598.

"ILA System Architecture SpecificationsRelease 1.0", Inlocation Alliance, Aug. 19, 2014, pp. 1-48.

Extended European Search Report received for corresponding European Patent Application No. 15894850.5, dated Jan. 3, 2019, 8 pages.

European Examination Report dated Jul. 7, 2020 as issued in corresponding EP Application No. 15894850.5, 6 pages.

Chinese Official Action dated Aug. 5, 2020 as issued in corresponding Chinese Application No. 201580082300.1, 10 pages.

* cited by examiner

CAUSING PERFORMANCE OF AN ACTIVE SCAN

RELATED APPLICATION

This application was originally filed as PCT Application No. PCT/FI2015/050401 filed Jun. 9, 2015.

FIELD

This specification relates to causing performance of an active scan.

BACKGROUND

Users of portable devices are surrounded by an increasing number of wireless devices to which it is possible to transmit packets in order to obtain additional information or to form a connection. This brings new challenges in relation to enabling devices efficiently to obtain information from one another and/or to form connections between the devices, particularly in a system in which many different users and remote apparatuses are present.

SUMMARY

In a first aspect, this specification describes a method comprising determining an orientation of a first apparatus with respect to a second apparatus based on at least one radio frequency packet passed wirelessly between the first and second apparatuses using an array of antennas forming part of at least one of the apparatuses, and causing performance of an active scan for the second apparatus or a third apparatus associated with the second apparatus only if it is determined that the orientation of the first apparatus with respect to the second apparatus satisfies at least one predetermined condition. The active scan may be performed using an identifier of the second apparatus or the third apparatus that is included in a radio frequency packet received from the second apparatus.

Causing performance of the active scan for the second apparatus or the third apparatus may include adding the second apparatus or the third apparatus to an active scan white list.

The method may comprise determining a direction of gaze of a user, and determining that the orientation of the first apparatus with respect to the second apparatus satisfies the predetermined condition if the direction of the gaze of the user and the orientation of the first apparatus with respect to the second apparatus adopt a predetermined relationship.

The method may comprise determining a direction of a gesture performed by the user, and determining that the orientation of the first apparatus with respect to the second apparatus satisfies the predetermined condition if the direction of the gesture of the user and the orientation of the first apparatus with respect to the second apparatus adopt a predetermined relationship.

The method may comprise causing performance of the active scan only if at least one further pre-determined condition with respect to the second apparatus or the third apparatus is also satisfied. In some examples, the method may comprise determining whether a user indication that a connection with the second apparatus or the third apparatus is desired has been received, and causing performance of the active scan only if to the user indication has been received. The method may also or alternatively comprise estimating a distance between the first and second apparatuses and causing performance of the active scan, only if the estimated distance satisfies a pre-determined criterion. The estimated distance may satisfy the pre-determined criterion if the estimated distance is less than a threshold distance. The method may additionally or alternatively comprise determining a received signal strength indication for at least one radio frequency packet received from the second apparatus and causing performance of the active scan, only if the received signal strength indication is determined to be above a threshold value. The method may additionally or alternatively comprise determining a type of the second apparatus or the third apparatus, and causing performance of the active scan, only if the apparatus is determined to be of a pre-defined type. The method may alternatively or additionally comprise determining a vertical distance between the first apparatus and the second apparatus, and causing performance of the active scan, only if the vertical distance satisfies a predetermined criterion. The vertical distance may satisfy the pre-determined criterion if the vertical distance is indicative of the first and second apparatuses being on the same floor.

In a second aspect, this specification describes apparatus configured to perform any method as described with reference to the first aspect.

In a third aspect, this specification describes apparatus comprising at least one processor, and at least one memory including computer program code, which when executed by the at least one processor, cause the apparatus: to determine an orientation of a first apparatus with respect to a second apparatus based on at least one radio frequency packet passed wirelessly between the first and second apparatuses using an array of antennas forming part of at least one of the apparatuses; and to cause performance of an active scan for the second apparatus or a third apparatus associated with the second apparatus only if it is determined that the orientation of the first apparatus with respect to the second apparatus satisfies at least one predetermined condition. The active scan may be performed using an identifier of the second apparatus or the third apparatus that is included in a radio frequency packet received from the second apparatus.

The computer program code, when executed by the at least one processor, may cause the apparatus to cause performance of the active scan at least by causing the second apparatus or the third apparatus to be added an active scan white list.

The computer program code, when executed by the at least one processor, may cause the apparatus to determine a direction of gaze of a user and to determine that the orientation of the first apparatus with respect to the second apparatus satisfies the predetermined condition if the direction of the gaze of the user and the orientation of the first apparatus with respect to the second apparatus adopt a predetermined relationship.

The computer program code, when executed by the at least one processor, may cause the apparatus to determine a direction of a gesture performed by the user and determine that the orientation of the first apparatus with respect to the second apparatus satisfies the predetermined condition if the direction of the gesture of the user and the orientation of the first apparatus with respect to the second apparatus adopt a predetermined relationship.

The computer program code, when executed by the at least one processor, may cause the apparatus to cause performance of the active scan only if at least one further pre-determined condition with respect to the second apparatus or the third apparatus is also satisfied. In some examples, the computer program code, when executed by the at least one processor, may cause the apparatus to determine whether a user indication that a connection with the second apparatus or the third apparatus is desired has been received and to cause performance of the active scan only if the user indication has been received. Also or alternatively, the computer program code, when executed by the at least one processor, may cause the apparatus to estimate a distance between the first and second apparatuses and causing performance of the active scan, only if the estimated distance satisfies a pre-determined criterion. The estimated distance may satisfy the pre-determined criterion if the estimated distance is less than a threshold distance. Also or alternatively, the computer program code, when executed by the at least one processor, may cause the apparatus to determine a received signal strength indication for at least one radio frequency packet received from the second apparatus and to cause performance of the active scan, only if the received signal strength indication is determined to be above a threshold value. Also or alternatively, the computer program code, when executed by the at least one processor, may cause the apparatus to determine a type of the second apparatus or the third apparatus, and cause performance of the active scan, only if the apparatus is determined to be of a pre-defined type. Also or alternatively, the computer program code, when executed by the at least one processor, may cause the apparatus to determine a vertical distance between the first apparatus and the second apparatus, and cause performance of the active scan, only if the vertical distance satisfies a predetermined criterion. The vertical distance may satisfy the pre-determined criterion if the vertical distance is indicative of the first and second apparatuses being on the same floor.

In a fourth aspect, this specification describes computer-readable code which, when executed by computing apparatus, causes the computing apparatus to perform any method as described with reference to the first aspect.

In a fifth aspect, this specification describes computer-readable medium having computer-readable code stored thereon, the computer readable code, when executed by a least one processor, cause performance of at least: determining an orientation of a first apparatus with respect to a second apparatus based on at least one radio frequency packet passed wirelessly between the first and second apparatuses using an array of antennas forming part of at least one of the apparatuses; and causing performance of an active scan for the second apparatus or a third apparatus associated with the second apparatus only if it is determined that the orientation of the first apparatus with respect to the second apparatus satisfies at least one predetermined condition.

In a sixth aspect, this specification describes apparatus comprising means for determining an orientation of a first apparatus with respect to a second apparatus based on at least one radio frequency packet passed wirelessly between the first and second apparatuses using an array of antennas forming part of at least one of the apparatuses, and means for causing performance of an active scan for the second apparatus or a third apparatus associated with the second apparatus only if it is determined that the orientation of the first apparatus with respect to the second apparatus satisfies at least one predetermined condition.

BRIEF DESCRIPTION OF THE FIGURES

For a more complete understanding of the methods, apparatuses and computer-readable instructions described herein, reference is now made to the following descriptions taken in connection with the accompanying drawings in which.

DETAILED DESCRIPTION

Figure 1:
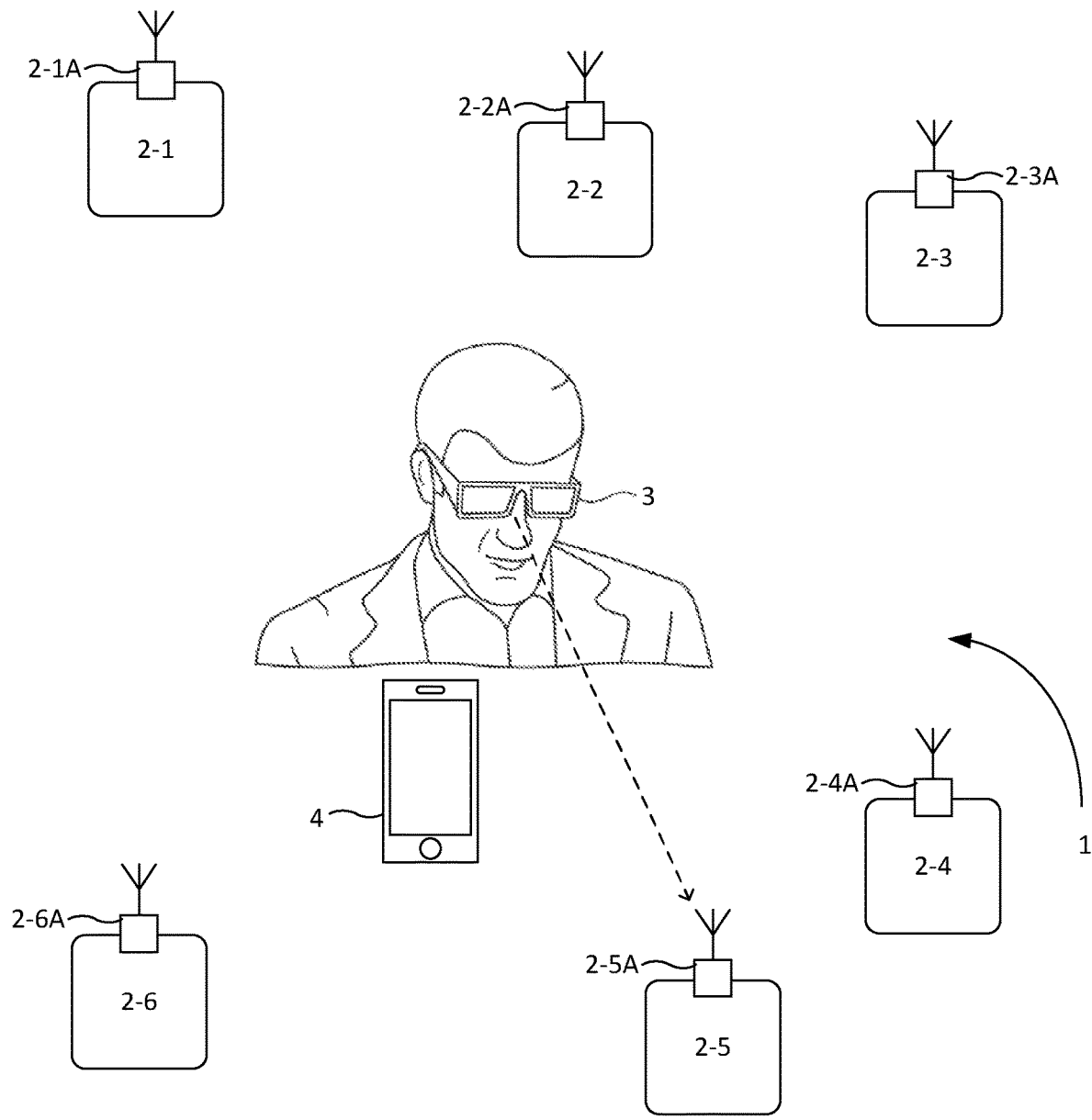
FIG. 1 is a simplified schematic illustration of a communication system 1 which enables a user selectively to cause performance of an active scan for remote apparatuses in order to obtain additional information from those apparatuses.

In the description and drawings, like reference numerals may refer to like elements throughout.

Referring to FIG. 1, a communication system 1 is illustrated which permits a user to selectively to cause formation of wireless connections between the user's communication apparatus 3, 4 and remote apparatuses 2-1 to 2-6. In this example, the user's communication apparatus 3, 4 includes two separate wireless devices 3, 4. More specifically, in the example of FIG. 1, the user's communication apparatus 3, 4 includes a wearable electronic device 3 (in this case, in the form of a head mounted device, specifically a pair of electronic glasses 3) and a portable communications device 4 (in this example, a mobile phone). As will be understood, however, the methods and operations described in this specification might, in some examples, be performed by just a single one of the wearable electronic device 3 and the portable communications device 4.

Each of the remote apparatuses 2-1 to 2-6 includes radio frequency tag functionality 2-1A to 2-6A. Such tag functionality 2-1A to 2-6A includes an ability to transmit a signal from which an orientation of the user's communication apparatus 3, 4 with respect to the remote apparatuses 2-1 to 2-6 can be determined. In examples, such as that of FIG. 1, in which the user's communication apparatus 3, 4 includes plural devices 3, 4, the determined orientation is the orientation of just one of the devices. The signals transmitted by the tag functionality and based on which the orientation of the user's communication apparatus 3, 4 can be determined may be referred to as positioning packets. The positioning packets may be one of two types: "Angle-of-Arrival" (AoA) and "Angle-of-Departure" (AoD). AoA packets are used when the tag functionality includes at least one antenna and the user's apparatus includes a phased antenna array 30 (see FIG. 3). AoD packets are used when the tag functionality includes a phased antenna array and the user apparatus 3, 4 includes at least one antenna for receiving the AoD packets.

The remote apparatuses 2-1 to 2-6 may include a simple tag for transmitting positioning packets. The tag may be a simple, self contained device having a very limited range of capabilities. In such examples, the tag may be associated with another more complex device or apparatus which is able to respond to an active scan. In these examples, the self-contained tag and the more complex apparatus may together be referred to as remote apparatus 2-1 to 2-6.

In other examples, the components which provide the tag functionality may not be provided as a self-contained device but may be provided as part of a more complex device which is able to perform operations other than those of which a simple tag is capable. Devices which may include tag functionality include, but are not limited to, portable communications devices such as mobile phones, smart watches and tablet computers. In such examples, the tag functionality may be disablable such that it is not active at all times and may be active only when it is required.

The user's communication apparatus 3, 4 is configured to cause performance of an active scan for one of the remote apparatuses if the orientation of the user's communication apparatus 3, 4 (or a particular part of it) with respect to the remote apparatuses 2-1 to 2-6 is found to satisfy a predetermined condition. Active scanning may be used by the user's communication apparatus 3, 4 in order to obtain further information from the subject of the active scan. The further information may be additional to that which can be received by performing a passive scan (e.g. Bluetooth Low Energy advertisement data). Performing an active scan may include transmitting a request packet in response to which a response packet is received from the subject apparatus of the active scan. An active scan may, in some instances, be used to obtain information necessary for forming a connection (such as a paired connection) between the two apparatuses. By causing performance of an active scan for one of the remote apparatuses if the orientation of the user's communication apparatus 3, 4 is found to satisfy a predetermined condition, the user is able easily to select a particular remote apparatus from which to obtain further information, simply by orientating their communication apparatus 3, 4 (or just one part of it) in a predetermined manner relative to the remote apparatus. This speeds up receipt of information and, if required, formation of a connection, particularly when many remote apparatuses are in the vicinity as it allows a targeted active scan to be performed. This reduces the number of collisions and improves reliability of communications, particularly in a system in which many different users and remote apparatuses are present.

Figure 2:
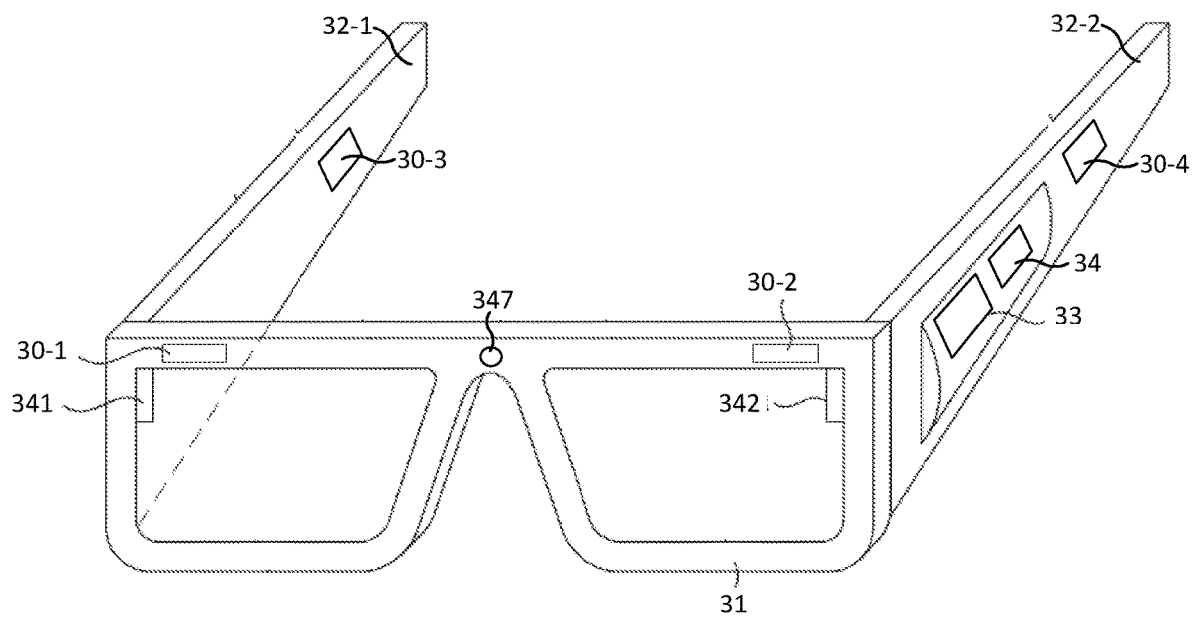
FIG. 2 is a simplified schematic illustration of an example of at least part of the user's communication apparatus shown in FIG. 1.
Figure 3:
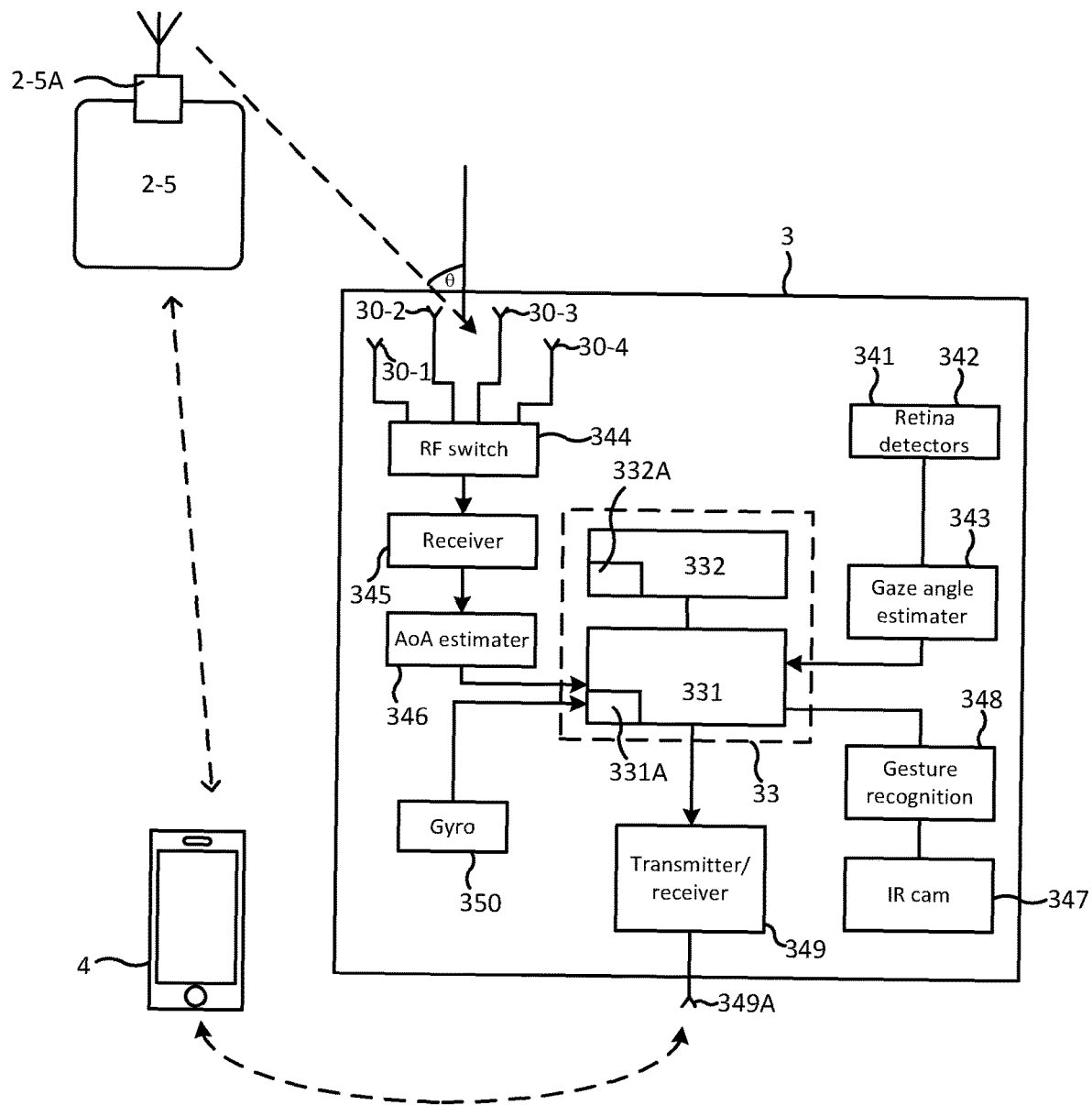
FIG. 3 is a block diagram schematically illustrating an example of a configuration of the user's communication apparatus shown in FIG. 2.

Referring to FIGS. 2 and 3, the user's communication apparatus 3, 4 includes an array 30 of antennas 30-1, 30-2, 30-3, 30-4 that are operable to detect signals (or positioning packets) transmitted by the remote apparatuses 2-1 to 2-6. The antennas 30-1 to 30-4 act as a phased array which can detect the angle of incidence θ of signals from the remote apparatus 2-5. This enables a bearing from the multi-antenna array 30 to the remote apparatus 2-5 to be determined. This determined bearing is indicative of the orientation of the antenna array 30, and so also the orientation of the user's communication apparatus 3, 4, with respect to the remote apparatus 2-5. Further, if the user's communication apparatus 3, 4 has an assumed orientation with respect to the user, the user's communication apparatus 3, 4 may also said to be operable to determine an orientation of the user with respect to the remote apparatuses.

In some examples, the antennas in the array 30 may be provided in a one-dimensional array (i.e. along a single axis). In such examples, user's communication apparatus 3, 4 is operable to determine an axis along which the remote apparatus is located relative to the user's communication apparatus. In such examples, the user's communication apparatus 3, 4 may be able to determine only that a remote apparatus 2-5 is located in one of two opposite directions (e.g. either front or its back). Put another way, the apparatus may be able to determine only that the bearing to a remote apparatus is either n degrees or is n+180 degrees.

In other examples, the antennas in the array 30 may be provided in a two dimensional array, as is the case in the example of FIG. 3. In these examples, the wireless communication apparatus 3, 4 is operable to determine a single direction or bearing towards the remote apparatuses 2-1 to 2-6.

In the example of FIG. 2, the antennas 30-1 to 30-4 are arranged in a two-dimensional arrangement. Specifically in FIG. 2, two antennas 30-1, 30-2 are provided in, or on, a portion 31 of the frame surrounding the lenses of the glasses 3 and one antenna 30-3, 30-4 is provided in each arm 32-1, 32-2 of the glasses.

The user's communication apparatus 3, 4 further includes a controller 33 configured to cause performance of at least some of the above-described operations. The controller 33 is also configured to control operation of various other components 34 of the apparatus 3, 4 (examples of which are discussed with reference to FIG. 3. In the example of FIG. 2, the controller 33 is provided in an arm of the glasses. At least some of the various other components 34 may also be provided in one of the arms 32-1, 32-2 of the glasses. Where the apparatus 3, 4 is in the form of two separate devices 3, 4 (as in FIG. 1), the other components 34 may be split between the two devices 3, 4.

In the example shown in FIG. 3, the apparatus 3, 4 further includes RF transceiver functionality 349 configured to transmit and receive data packets via at least one RF to antenna 349A. The RF transceiver functionality 349 (hereafter RF transceiver 349) is operable under the control of the controller 33. The RF transceiver functionality 349 may be provided by a Bluetooth transceiver (e.g. a BLE transceiver).

The controller 33 may respond to a determination that the orientation of the multi-antenna array 30 with respect to the remote apparatus satisfies a predetermined condition by causing the RF transceiver 349 to transmit a signal to the intermediary device (e.g. the portable communication apparatus 4 for causing the intermediary device to perform an active scan for the remote apparatus 2-5. This is illustrated in FIG. 3. In other examples, however, particularly where the wireless communication apparatus 3, 4 is made up of a single device, the controller 33 may respond to a determination that the predetermined condition is satisfied by causing an active scan for the remote apparatus 2-5 to be performed using the RF transceiver 349. In other words, the active scan may be performed by the device 3 which includes the multi-antenna array 30.

In some examples, the user's communication apparatus 3, 4 may further include a gaze detector 341, 342, 343. The gaze detector 341, 342, 343 may include at least one retina detector 341, 342 which detects the user's eye movement. The gaze detector 341, 342, 343 may further include a gaze angle estimator 343 to determine the angle of gaze of the user. In the example of FIG. 2, first and second retina detectors 341, 342 are provided, one adjacent each lens of the glasses. The retina detectors 341, 342 may operate using photodetectors which track movement of the user's retina so as to determine their gaze direction.

In examples in which the user's communication apparatus 3, 4 does include a gaze detector 341, 342, 343 the predetermined condition (which should be satisfied in order for an active scan to be performed) may be that the orientation of the antenna array 30 with respect to the remote apparatus and the gaze direction adopt a predetermined relationship. More specifically, the predetermined relationship may be that the orientation is indicative of the bearing towards the remote apparatus being generally aligned with the gaze direction.

In some examples, the wireless communication apparatus 3, 4 may further include manual gesture recognition components 347, 348 configured to determine a direction of a manual gesture. The manual gesture recognition components 347, 348 may include an optical sensor 347, for example an infra-red camera, for detecting a position of the user's hand. Data relating to the detected position is passed to a manual gesture recognition module 348 configured to identify a direction of a manual gesture made by the user. In the example of FIG. 2, the optical sensor 347 is provided in the portion of the frame 31 surrounding or holding the lenses.

In examples in which the user's communication apparatus 3, 4 includes manual gesture recognition components 347, 348, the predetermined condition may be that the orientation of the antenna array 30 with respect to the remote apparatus and the manual gesture direction adopt a predetermined relationship. More specifically, the predetermined relationship may be that the orientation is indicative of the bearing towards the remote apparatus being generally aligned with the manual gesture direction.

The user's communication apparatus 3, 4 may include a gyro device 350 (e.g. a solid state gyro device) configured to detect movement of the apparatus 3, 4 which may be interpreted by the controller 33. User inputs and indications may therefore be provided by moving the apparatus 3, 4. User inputs may also or alternatively be provided via a user-input interface 42 (see FIG. 4) of a different kind e.g. a touch-sensitive transducer, such as a touch screen, one or more depressible keys or buttons, a voice control interface etc.

As user herein, the term "gesture" may cover any type of gesture including but not limited to eye movements and blinking of the eyes (both of which may be detected by the gaze detector), head movements (which may be detected by the gyro device) and manual gestures (which may be detected by the manual gesture recognition components). As such, the manual gesture recognition components, the gaze detector, and the gyro device may be referred to as gesture detectors via which user inputs or indications in the form of gestures can be provided.

The user's communication apparatus 3, 4 may further include an RF switch 344 which sequentially connects the individual antennas 30-1 to 30-4 to a receiver 345. In the example, the receiver 345 is a BLE receiver which provides sequential signals from the individual antennas to an AoA estimator 346 in order to determine the angle θ or bearing to the remote apparatus 2-5. The bearing to the remote apparatus 2-5 is indicative of an orientation of the user's apparatus 3, 4 with respect to the remote apparatus 2-5. As discussed above, the orientation of the user's apparatus 3, 4 may in turn correspond to the orientation the user.

The tag functionality 2-5A of the remote apparatus 2-5 may be configured to operate using any suitable type of wireless transmission/reception technology. Suitable types of technology include, but are not limited to Bluetooth Basic Rate/Enhanced Data Rate (BR/EDR) and Bluetooth Low Energy (BLE). Bluetooth Low Energy (BLE) is a relatively new wireless communication technology published by the Bluetooth SIG as a component of Bluetooth Core Specification Version 4.0. Other types of suitable technology include WLAN and ZigBee. The use of BLE may be particularly useful due to its relatively low energy consumption and because most mobile phones and other portable electronic devices will be capable of communicating using BLE technology.

The signals transmitted by the tag functionality 2-1A to 2-6A of the remote apparatus 2-1 to 2-6 may be according to the Nokia High Accuracy Indoor Positioning (HAIP) solution for example as described at http://www.in-location-alliance.com.

Figure 4:
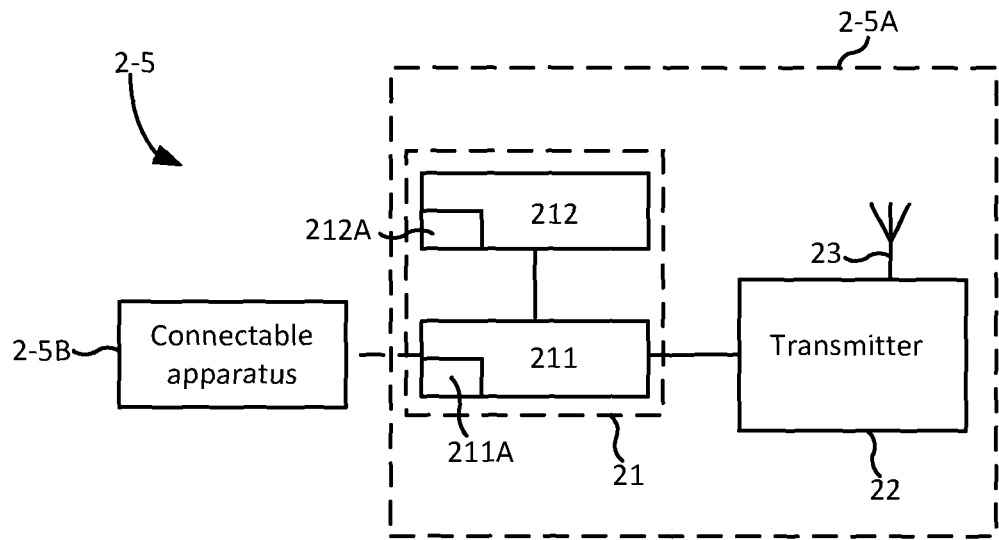
FIG. 4 is a schematic illustration of one of the remote apparatuses of FIG. 1.

FIG. 4 is a schematic illustration of one of the remote apparatuses 2-1 to 2-6 of FIG. 1. The remote apparatus 2-5 comprises tag functionality 2-5A comprising a controller configured to control a transmitter 22 to transmit signals (e.g. positioning packets) via an antenna 23 for detection by the wireless communication apparatus 3, 4. The transmitter 22 may further provide reception functionality such that the tag functionality 2-5A can also receive data packets from the user's communication apparatus 3, 4. In some examples, the tag functionality 2-5A is operable to respond to an active scan by providing further information and, in some instances, also to maintain a connection with the user's communication apparatus 3, 4 for transmitting and/or receiving data. The response to the active scan and/or the connection may for instance be provided using a Bluetooth protocol.

In other examples, the remote apparatus 2-5 may include, in addition to the tag functionality 2-5A, a connectable apparatus 2-5B configured to respond to an active scan by providing further information. In some in some instances, the connectable apparatus 2-5B may be configured to form connection with the user's communication apparatus 3, 4. In such examples, the tag functionality may be configured simply to transmit signals such as positioning packets for allowing a bearing between it and the recipient apparatus 3, 4 to be determined, with any response to the active scan and subsequent connection (if required) being provided by the connectable apparatus 2-5B. Although, not shown in FIG. 4, it will be appreciated that the connectable apparatus 2-5B includes at least a controller, a transceiver and an antenna for enabling transmission of a response to the active scan (e.g. via Bluetooth) to the user's communication apparatus 3, 4.

The controller 21 of the tag functionality may be configured to produce the AoA signal. The AoA signal, also referred to as a positioning packet, may include an identifier for identifying the tag functionality 2-5A and/or the connectable apparatus 2-5B. Where the active scan response is provided by the tag functionality 2-5A, the identifier enables identification of the tag functionality. When the response is provided by the connectable apparatus 2-5B, the identifier enables identification of the connectable apparatus 2-5B. The identifier enables performance of an active scan for the remote apparatus thereby to receive additional information from the remote apparatus 2-5 at the wireless communication apparatus 3, 4. The identifier may be for instance a Bluetooth address.

Figure 5:
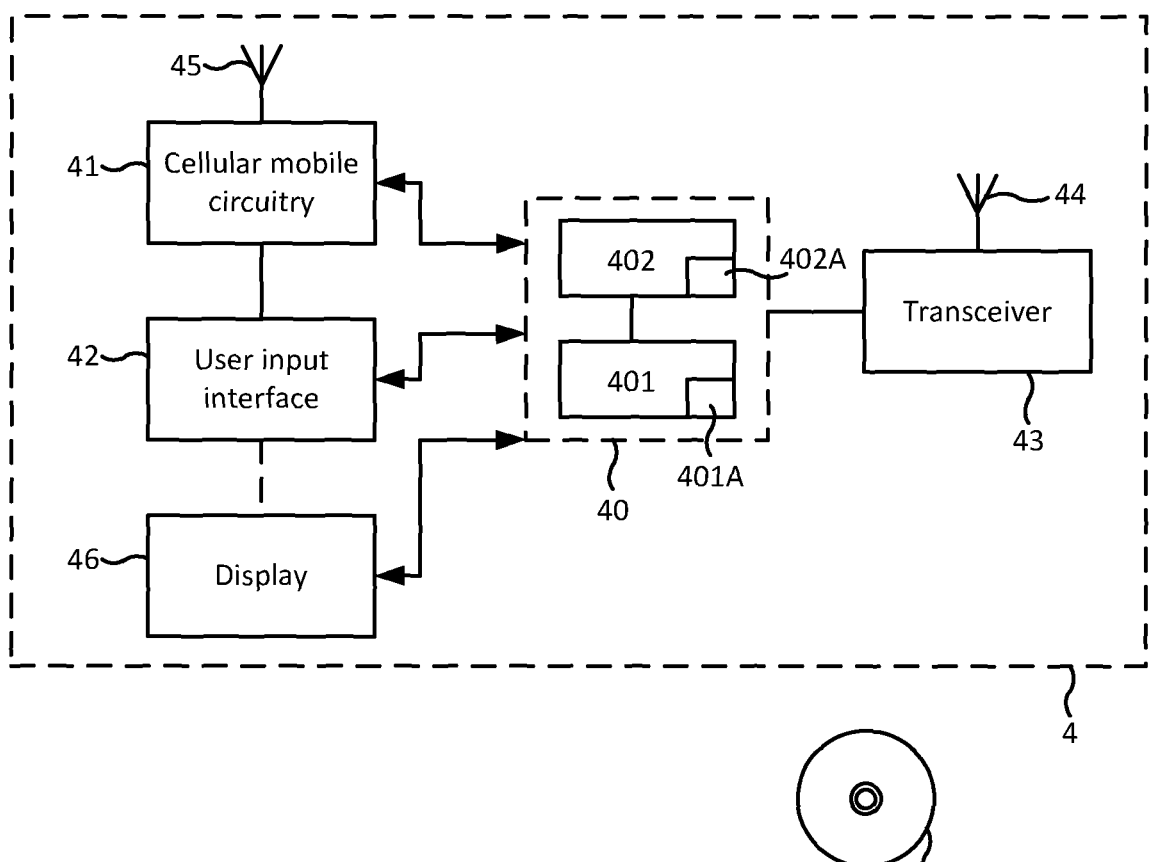
FIG. 5 is a schematic illustration of a second part the user's communication apparatus according to some examples.

A simplified schematic block diagram of major circuit components of the portable communications apparatus 4 is illustrated in FIG. 5. The portable communications device 4 includes a transmitter/receiver (or a transceiver) 43 with an associated antenna 44, which is coupled to and controlled by a controller 40. The transmitter/receiver 43 and an associated antenna 44 may be configured to receive messages from the transmitter 349 of the wearable electronic device 3. The transmitter/receiver 43 may also be capable of transmitting wireless messages such as active scan request packet to the remote apparatus 2-5, and receiving wireless messages such as the subsequent response packet from the remote apparatus 2-5. The transmitter/receiver 43 may also be capable, under the control of the controller 40, to forming a connection with the remote apparatus 2-5. The transmitter/receiver 43 may be configured to operate using a Bluetooth protocol, such as BLE. As mentioned briefly above, the portable communications device 4 may include a user interface for receiving user inputs from the user. It may also include a display 46 for outputting visual information to the user. In some examples, the display 46 and user input interface 42 may form a touchscreen.

Figure 6A:
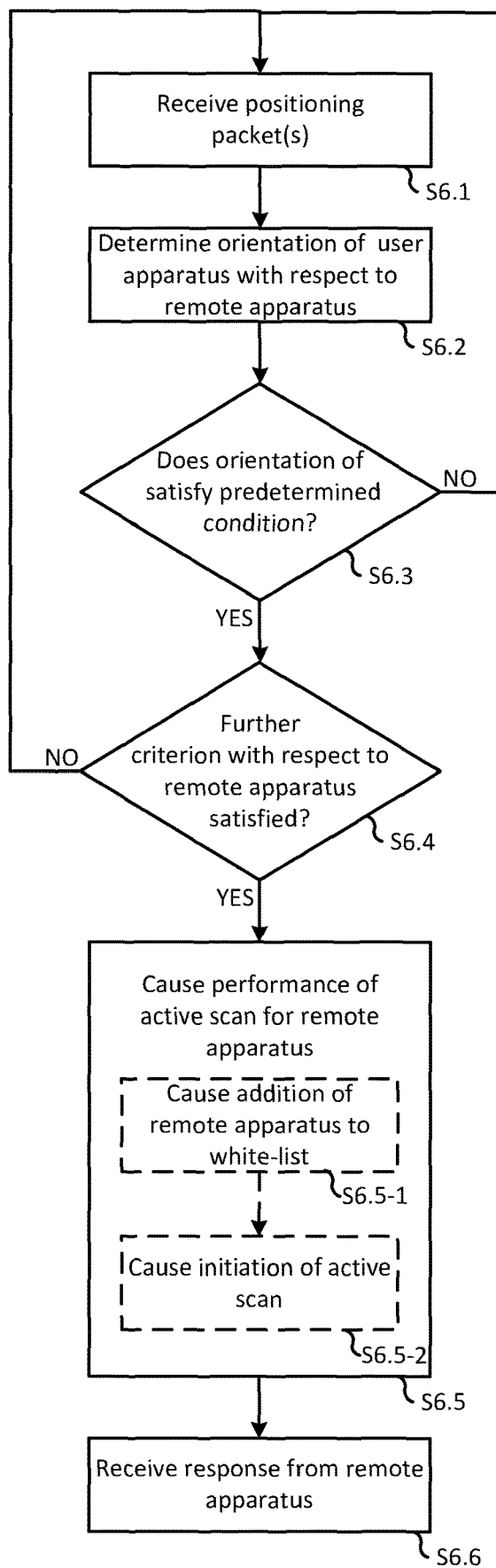
FIGS. 6A to 6C are flowcharts illustrating various operations which may be performed by the user's communication apparatus.
Figure 6B:
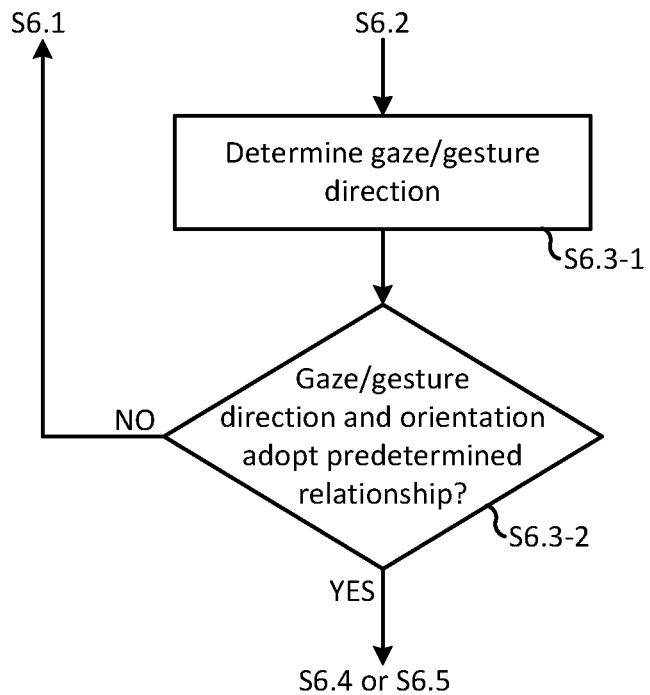
Figure 6C:
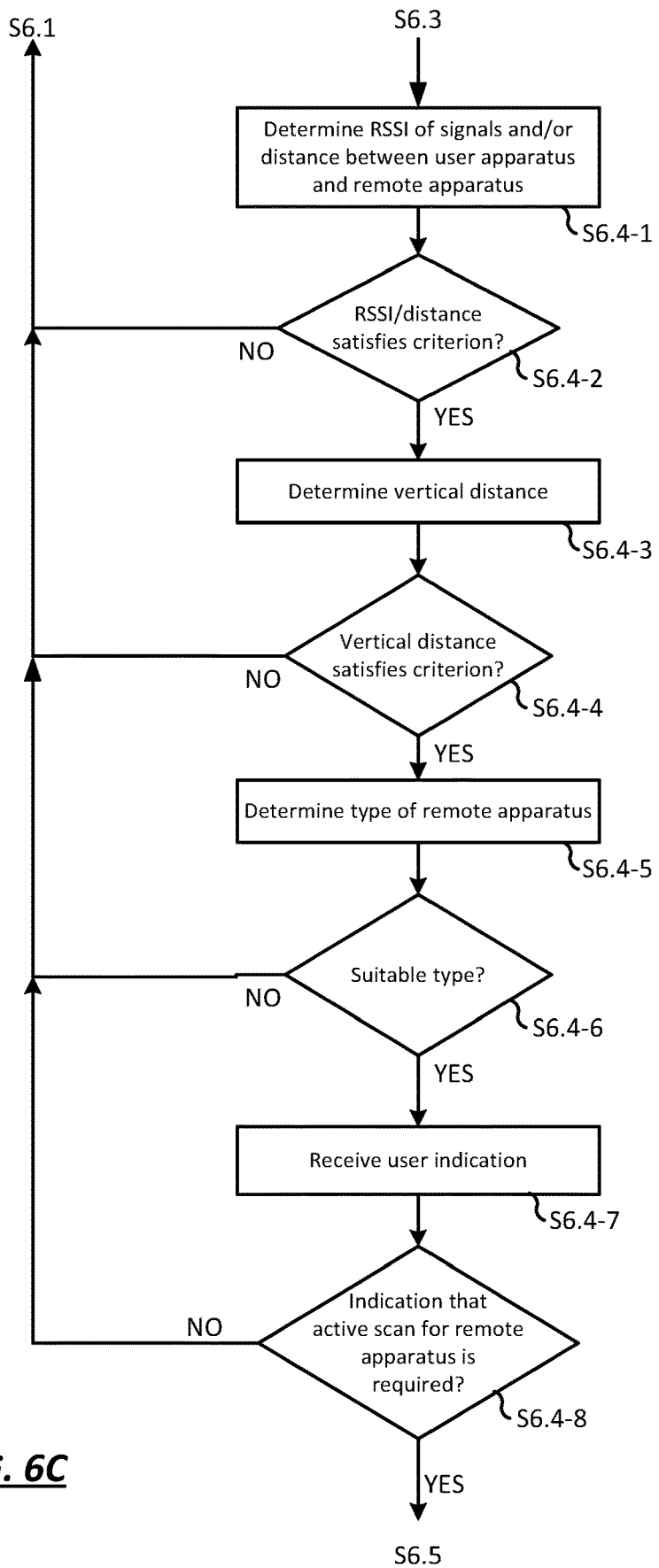

In this example, the portable communications device 4 is a mobile phone and so additionally includes cellular mobile circuitry 41 with an associated antenna 45 for use with a mobile telephony network FIGS. 6A, 6B and 6C illustrate various operations which may be performed by the user's communication apparatus 3, 4 as described with reference to FIGS. 1, 2, 3 and 5.

In operation S6.1, the apparatus 3, 4 receives a signal (e.g. in the form of a positioning packet) from the remote apparatus 2-5.

In operation S6.2, the user's communication apparatus 3, 4 uses the multi-antenna array 30 to estimate a bearing towards the remote apparatus 2-5 thereby to determine an orientation of the user's communication apparatus with respect to the remote apparatus 2-5.

In some examples, the user's communication apparatus 3, 4 next proceeds to operation S6.3 in which it is determined if the orientation of the user's apparatus 3 with respect to the remote apparatus 2-5 satisfies a predetermined condition. The orientation may satisfy the predetermined condition if it is indicative of the device being oriented towards, or generally towards, the remote apparatus 2-5. Put another way, the predetermined condition may be satisfied if the orientation is indicative of the bearing having a particular value or being within a permitted range of values. The permitted range or values may be, for instance 45 degrees, either side of a bearing which corresponds to the antenna array device 3 directly facing the remote apparatus 2-5.

If it is determined that the orientation of at least part of the user's communication apparatus 3, 4 with respect to the remote apparatus 2-5 satisfies the predetermined condition, the user's communication apparatus 3, 4 may be configured to proceed to operation S6.4. It will be appreciated, however, that in other examples the user's communication apparatus may be configured to proceed directly to operation S6.5.

In operation S6.4, the user's communication apparatus 3, 4 determines if at least one further criterion with respect to the remote apparatus 2-5 has been satisfied. This may include a number of different operations which are discussed below with reference to FIG. 6C.

If it is determined that the requisite at least one further criterion is not satisfied, the user's communication apparatus 3, 4 returns to operation S6.1. If, however, it is determined that the at least one further criterion is satisfied, the wireless communication apparatus 3, 4 proceeds to operation S6.5.

In operation S6.5, the user's communication apparatus 3, 4 causes performance of an active scan for the remote apparatus 2-5. This operation may be performed on the basis of an identifier, such as a Bluetooth address, of the remote apparatus 2-5. This may have been included in at least one of the received positioning packets.

Causing performance of the active scan may include, in operation S6.5-1, causing addition of the remote apparatus to a stored white-list. The white-list may be a list of remote apparatuses for which active scanning is permitted. The user's communication apparatus 3, 4 may be configured such that, if a remote apparatus 2-5 is not on the white-list, active scans for that remote apparatus 2-5 are not performed.

The white-list may include the identifiers of various remote apparatuses and may be stored by the user's communication apparatus 3, 4.

Causing performance of the active scan may further include causing initiation of the active scan in operation S6.5-2. Causing initiation of the active scan may include using the identifier of the remote apparatus to listen for transmissions from the apparatus or using the identifier to transmit paging packets to the remote apparatus in order to form a connection. Active scanning is known in the art and so will not be described in further detail in this specification.

As discussed above, performance of the active scanning may be carried out by the device which receives the positioning packets from the remote apparatus 2-5 or by an intermediary device 4 in response to one or more signals received from device 3 which receives the positioning packets.

Subsequent to causing performance of the active scan, operation S6.6 may be performed. In operation S6.6, if the remote apparatus 2-5 is successfully discovered during the active scan, a response packet from the remote apparatus may be received. In some instances, a connection with the remote apparatus may subsequently be formed. Similarly to performance of the active scan, the response packet may be received by either of the device 3 that receives the positioning packets and the intermediary device 4.

It will be understood from the above discussion with respect to FIG. 6A that the wireless communication apparatus 3, 4 may be operable to allow a user to cause a connection to be formed between their communication apparatus 3, 4 and the remote apparatus simply by orienting at least part of their apparatus 3 generally towards the remote apparatus 2-5 with which a connection is desired. Consequently, if as in the examples of FIGS. 1 to 3, the user's apparatus includes electronic glasses 3, the user or wearer may be able to cause a connection to be formed with the remote apparatus 2-5 simply by looking generally towards the remote apparatus 2-5 when wearing the glasses 3.

FIG. 6B, is a portion of a flowchart illustrating various operations which may, in some examples, make up the determination operation of S6.3 described with reference to FIG. 6A.

After determining, in operation S6.2, the orientation of the user's communication apparatus with respect to the remote apparatus, the user's communication apparatus may proceed to operation S6.3-1 in which a gaze direction and/or a manual gesture direction are determined. As discussed above with reference to FIGS. 1 to 3, the gaze direction may be determined using the gaze detector 341, 342, 343 of the communication apparatus 3, 4. The manual gesture direction may be determined using the manual gesture recognition components 347, 348.

Subsequently, in operation S6.3-2, it is determined if the orientation of the multi-antenna array part of the wireless communication apparatus and the gaze and/or manual gesture direction determined, in operation S6.3-1, adopt a predetermined relationship. The predetermined relationship may include the direction of the gaze and/or the manual gesture being generally aligned with the determined bearing from the user's communication apparatus 3 and the remote apparatus 2-5. As discussed above, a degree of variance in the alignment may be permitted.

If it is determined that the gaze and/or manual gesture direction and the orientation of the device do not adopt the predetermined relationship, the user's communication apparatus 3, 4 returns to operation S6.1. If, however, it is determined that the gaze and/or manual gesture direction and the orientation do adopt the predetermined relationship, the user's communication apparatus 3, 4 proceeds to one of operation S6.4 and operation S6.5.

It will thus be appreciated that an active scan for a remote apparatus 2-5 may be caused in response to the user looking (or gazing) towards the remote apparatus 2-5 and/or gesturing (e.g. pointing) towards the remote apparatus 2-5. In some examples, only one of the gaze direction and manual gesture direction are determined, in which case only the determined manual gesture or gaze direction must be found to adopt the predetermined relationship with orientation of the device. In other examples, both the gaze direction and the manual gesture direction may be determinable. In these examples, in order for the active scan to be performed, it may be that both the gaze direction and a manual gesture direction must be found to adopt the predetermined relationship with the orientation of the user's apparatus 3 or, instead, it may be sufficient that only one of the gaze and manual gesture directions adopt the predetermined relationship.

FIG. 6C is a flowchart illustrating various operations, combinations of which may make up the determination of operation S6.4 of FIG. 6A. As will be appreciated the order in which the steps are performed may be different to that shown in FIG. 6C and also various operations may be omitted.

The operations of FIG. 6C may be performed after it is determined, in operation S6.3, that the orientation of the user's communication apparatus 3, 4 with respect to the remote apparatus satisfies the predetermined condition.

In operation S6.4-1, the user's communication apparatus 3, 4 determines or estimates a distance between it and the remote apparatus 2-5. This determination may be based on received signal strength indications (RSSI) of the signals received from the remote apparatus 2-5. Alternatively, instead of determining or estimating a distance between the user's communication apparatus 3, 4 and remote apparatus 2-5, the user's communication apparatus 3, 4 may instead simply determine the RSSI of the signals received from the remote apparatus 2-5.

Next, in operation S6.4-2, it is determined whether the RSSI (or the estimated distance) satisfies a predetermined criterion. The RSSI may satisfy the criterion if the RSSI is above a threshold value. The distance may satisfy the criterion if, for instance, it is below a threshold distance.

If it is determined that the RSSI and/or the distance satisfies the criterion, the user's communication apparatus 3, 4 may proceed to operation S6.4-3 (or one of operations S6.4-7 and S6.6). If, however, it is determined that the RSSI and/or distance does not satisfy the criterion, the user's communication apparatus 3, 4 may return to performance operation S6.1.

As will be appreciated, applying a threshold distance, may allow an active scan for remote apparatuses to be performed only for remote apparatuses which are nearby. This may reduce occurrences of unintentional active scans for remote apparatuses that are far away, but just happen to be in the direction in which the user's apparatus 3, 4 is orientated. Similarly, application of a threshold RSSI value may not only prevent performance of scans for distant apparatuses 2-5, but may also prevent active scanning for apparatuses which are in different rooms or are obstructed from view. This is because the signals from the 2-5A are attenuated by intervening walls/obstructions and so the RSSI of those signals will be lower.

In operation S6.4-3, the user's communication apparatus 3, 4 determines a vertical distance between itself and the remote apparatus 2-5. The vertical distance may be determined in one of a number of different ways. For instance, if the distance is determined in operation S6.4-1, the distance and orientation may be used to determine the vertical distance. Alternatively, if RSSI is determined in operation S6.4-1, the RSSI and orientation may be used to estimate the vertical distance. If neither distance nor RSSI is known, then the orientation alone may be used to estimate the vertical distance.

Next, in operation S6.4-4, the user's communication apparatus 3, 4 determines if the vertical distance satisfies a predetermined criterion. The predetermined criterion may be satisfied, for instance, if the vertical distance indicates that the remote apparatus 2-5 and the user's communication apparatus 3, 4 are on the same floor of a building. As such, unintentional performance of active scans for remote apparatuses 2-5 may be prevented. The vertical distance may be found to indicate that the remote apparatus 2-5 and the user's communication apparatus 3, 4 are on the same floor of a building, if the vertical distance is less than a threshold vertical distance.

If it is determined that the vertical distance does not satisfy the criterion (for instance if the vertical distance indicates that the remote apparatus is on a different floor of a building), the user's communication apparatus 3, 4 may return to performance of operation S6.1. If, however, it is determined that the vertical distance does satisfy the criterion, the user's communication apparatus 3, 4 may proceed to operation S6.4-5 (or operation S6.6).

In operation S6.4-5, the user's communication apparatus 3, 4 determines a type of the remote apparatus 2-5. This may be determined for instance based on information included in the signals received from the remote apparatus 2-5.

Next, in operation S6.4-6, it is determined if the remote apparatus is of a suitable or allowed type. A list of allowed or suitable types may be stored by the user apparatus 3, 4. For instance, the determined type may indicate whether or not the remote apparatus is configured to provide responses to an active scan and/or is able to participate in a connection with another apparatus. In such an example, if the remote apparatus is of a type which is not suitable to provide responses to an active scan, it will be determined the type is not suitable (or allowed). If it is determined that the device is suitable, the apparatus 3, 4 may proceed to operation S6.4-7. If, however, it is determined that the type of the remote apparatus is not suitable, the apparatus 3, 4 may return to performance of operation S6.1. Other information upon which the determination of S6-4.6 may be made may include information indicating services available from the remote apparatus (e.g. if a particular service is available, the apparatus may be determined to be suitable) and whether or not the remote apparatus is known by the user apparatus (e.g. if the remote apparatus is not known, it may be determined that the remote apparatus is not suitable).

Performance of operations S6.4-5 and S6.4-6 may prevent computing resources being wasted by preventing active scans being performed in respect of remote apparatuses which are not of a suitable type (e.g. with which a connection is not possible).

In operation S6.4-7 (which may in some examples be performed directly after operation S6.3), a user indication is received. The user indication may be received via any suitable interface, such as one of the gesture detectors. For instance, it may be provided by the user moving the wireless communication apparatus in a predetermined manner. This may be detected by the gyro device 350. Alternatively, the user indication may be received via an input interface such as a touch sensitive panel and/or a physical key. In yet other examples, the user indication may be received via a voice control interface.

Subsequently, in operation S6.4-8 it is determined if the received user indication indicates that an active scan for the remote apparatus 2-5 by the user's apparatus 3, 4 is desired. This may be indicated in any suitable way. For instance, the user may select a selectable option which is caused to be presented to the user by their apparatus 3, 4 in response to a positive determination being reached in operation S6.3. The selectable option may allow the user to indicate whether or not they would like an active scan for the remote apparatus 2-5 to be performed. Similarly, the user may indicate that they wish for the active scan to occur by performing a recognised movement of their apparatus 3, 4 (e.g. nodding their head while wearing the glasses 3) which is detectable using the gyro device 350. Alternatively, the indication may be provided via a voice interface.

If it is determined in operation S6.4-8 that an active scan for the remote apparatus 2-5 is required, the user's communication apparatus 3, 4 may proceed to operation S6.5. If, however, it is determined that an active scan is not required, the user's communication apparatus may return to operation S6.1.

Various operations described with reference to FIG. 6C reduce the likelihood that performance of an active scan is unintentionally caused. As will of course be appreciated, the user's apparatus 3, 4 may be configured to perform all of the operations of FIG. 6C (in the order shown in the Figure or in a different order) or may be configured only to perform any appropriate subset of the operations shown (for example, but not limited to, only operations S6.4-7 and S6.4-8).

Many modifications and variations of the described systems are possible. For example, the lenses of the head-mounted device 3 in the example of FIGS. 1 to 3 may form part of augmented reality (AR) display. In such examples, an AR source may be provided to project visibly discernable data onto the lenses through a display configuration, thereby to provide data to the user which may be associated with their current field of view.

Also, the detection of the AoA/AoD signals from respective remote apparatuses need not necessarily be performed by a wearable electronic device 3 but could be carried out by the portable communications device 4. In such embodiments, the antenna array 19 may be provided at the portable communications device 4 along with the controller 33 and various ones of the other components 43. In these examples, the wearable electronic device 3 may be omitted. Alternatively, the wearable device may be included (even without the antenna array) and may include components for enabling determination of gaze and/or manual gesture direction.

In some examples, the antenna array 30 is provided in the wearable device 3 and the data received by the antenna array is transmitted by a wireless link to the portable communications device 4 for processing in order to obtain the orientation angle θ. Similarly, the data received from the gaze and/or manual gesture detection components may be transmitted to the portable device 4 for processing in order to obtain the gaze and/or manual gesture direction.

As already discussed, "alignment" or "general alignment", as used herein, may include range of angles around an exact alignment, suitable for indicating that the user apparatus 3, 4 is oriented generally towards the remote apparatus 2-5 or (if applicable) that the user is gazing and/or gesturing generally in the direction of the remote apparatus 2-5.

Also as discussed above, the functionality described with reference to the Figures may be provided by single device e.g. one of the wearable device 3 and the portable communications device 4 which may be configured to perform at least operations S6.1 to S6.3 and S6.5 to S6.6 as described with reference to FIG. 6A. Put another way, the wearable device 3 may be a standalone device configured to perform the functions described above with reference user's communication apparatus 3, 4. Alternatively, the wearable device 3 may be an auxiliary device which maintains an ongoing connection with the portable communications device with the two devices performing different ones of the above-described operations.

In examples in which the user's apparatus 3, 4 includes a wearable device 3, this may be of a different type to that illustrated in the figures. For instance, the wearable device 3 may be a smart watch.

Although not shown in the Figures, in some examples the multi-antenna array may be included in the tag functionality 2-5A and a single antenna may be included in the user apparatus 3, 4 for receiving Angle-of-Departure (AoD) packets from the antenna array. Based on the received AoD packets the bearing from the user apparatus 3, 4 to the remote apparatus 2-5 may be determined.

Some further details of components and features of the above-described apparatuses 3, 4, 2.5A and alternatives for them will now be described.

The controllers 33, 21, 40 of each of the apparatuses or devices 3, 4, 2.5A comprise processing circuitry 331, 211, 401 communicatively coupled with memory 332, 212, 402. The memory 332, 212, 402 has computer readable instructions 332A, 212A, 402A stored thereon, which when executed by the processing circuitry 331, 211, 401 causes the processing circuitry 331, 211, 401 to cause performance of various ones of the operations described with reference to FIGS. 1 to 6C.

The processing circuitry 331, 211, 401 of any of the apparatuses 3, 4, 2.5A of FIGS. 1 to 6 may be of any suitable composition and may include one or more processors 331A, 211A, 401A of any suitable type or suitable combination of types. For example, the processing circuitry 331, 211, 401 may be a programmable processor that interprets computer program instructions 332A, 212A, 402A and processes data. The processing circuitry 331, 211, 401 may include plural programmable processors. Alternatively, the processing circuitry 331, 211, 401 may be, for example, programmable hardware with embedded firmware. The processing circuitry 331, 211, 401 may be termed processing means. The processing to circuitry 331, 211, 401 may alternatively or additionally include one or more Application Specific Integrated Circuits (ASICs). In some instances, processing circuitry 331, 211, 401 may be referred to as computing apparatus.

The processing circuitry 331, 211, 401 is coupled to the respective memory (or one or more storage devices) 332, 212, 402 and is operable to read/write data to/from the memory 332, 212, 402. The memory 332, 212, 402 may comprise a single memory unit or a plurality of memory units, upon which the computer readable instructions (or code) 332A, 212A, 402A is stored. For example, the memory 332, 212, 402 may comprise both volatile memory and non-volatile memory. For example, the computer readable instructions 332A, 212A, 402A may be stored in the non-volatile memory and may be executed by the processing circuitry 331, 211, 401 using the volatile memory for temporary storage of data or data and instructions. Examples of volatile memory include RAM, DRAM, SDRAM etc.

Examples of non-volatile memory include ROM, PROM, EEPROM, flash memory, optical storage, magnetic storage, etc. The memories in general may be referred to as non-transitory computer readable memory media.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions 332A, 212A, 402A may be pre-programmed into the apparatuses 3, 4, 2.5A. Alternatively, the computer readable instructions 332A, 212A, 402A may arrive at the apparatus 3, 4, 2.5A via an electromagnetic carrier signal or may be copied from a physical entity 210 (see FIG. 6) such as a computer program product, a memory device or a rec medium such as a CD-ROM or DVD. The computer readable instructions 332A, 212A, 402A may provide the logic and routines that enables the devices/apparatuses 3, 4, 2.5A to perform the functionality described above.

The combination of computer-readable instructions stored on memory (of any of the types described above) may be referred to as a computer program product.

Where applicable, the BLE-capability of the apparatuses 3, 4, 2.5A may be provided by a single integrated circuit. It may alternatively be provided by a set of integrated circuits (i.e. a chipset). The BLE-capability may alternatively be a hardwired, application-specific integrated circuit (ASIC).

Although the specific embodiments have been described primarily with reference to Bluetooth Low Energy (BLE), it will be appreciated that other suitable protocols may alternatively be used. Such protocols may include 802.11 wireless local area network protocols, other types of Bluetooth protocol or ZigBee protocols.

As will be appreciated, the apparatuses 3, 4, 2.5A described herein may include various components which have may not been shown in the Figures. The apparatuses 3, 4, 2.5A may comprise further optional SW components which are not described in this specification since they may not have direct interaction to embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc, or a "processor" or "processing circuitry" etc. should be understood to encompass not only computers having differing architectures such as single/multi processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method comprising:
receiving one or more radio frequency positioning packets by a wearable apparatus worn by a user, from a corresponding one or more remote wireless apparatuses, using a phased array of antennas forming part of the wearable apparatus;
determining by the wearable apparatus, an orientation of the wearable apparatus with respect to a respective one of the one or more remote wireless apparatuses based on at least a respective one of the one or more received radio frequency positioning packets;
determining by the wearable apparatus, a gaze direction of the user's eye movement using at least one retina detector forming part of the wearable apparatus, while looking from the wearable apparatus toward the respective one remote wireless apparatus;
determining by the wearable apparatus, an occurrence of a predetermined relationship that the orientation is indicative of a bearing towards the respective one remote wireless apparatus being aligned with the gaze direction;
transmitting to a portable communications device, using a transmitter forming part of the wearable apparatus, a message for the portable communications device to transmit a wireless active scan request packet to the one remote wireless apparatus for performance of an active scan for the one remote wireless apparatus or a third apparatus associated with the one remote wireless apparatus, in response to the determination of the predetermined relationship.

2. The method of claim 1, wherein the active scan is performed using an identifier of the one remote wireless apparatus or the third apparatus that is included in a radio frequency packet received from the one remote wireless apparatus.

3. The method of claim 1, wherein causing performance of the active scan for the one remote wireless apparatus or the third apparatus includes adding the one remote wireless apparatus or the third apparatus to an active scan white list.

4. The method of claim 1, comprising:
determining a direction of a gesture performed by the user;
determining that the orientation of the wearable apparatus with respect to the one remote wireless apparatus satisfies the predetermined condition if the direction of the gesture of the user and the orientation of the wearable apparatus with respect to the one remote wireless apparatus adopt a predetermined relationship.

5. The method of claim 1 comprising:
causing performance of the active scan if at least one further pre-determined condition with respect to the one remote wireless apparatus or the third apparatus is also satisfied, wherein the method further comprises at least one of :
a) determining whether a user indication that a connection with the one remote wireless apparatus or the third apparatus is desired has been received and causing performance of the active scan if the user indication has been received, or
b) estimating a distance between the wearable and one remote wireless apparatuses and causing performance of the active scan, if the estimated distance satisfies a pre-determined criterion wherein the estimated distance satisfies the pre-determined criterion if the estimated distance is less than a threshold distance, or
c) determining a received signal strength indication for at least one radio frequency packet received from the one remote wireless apparatus and causing performance of the active scan, if the received signal strength indication is determined to be above a threshold value.

6. The method of claim 5, comprising:
determining a type of the one remote wireless apparatus or the third apparatus; and
causing performance of the active scan, if the apparatus is determined to be of a pre-defined type.

7. The method of claim 1, further comprising:
determining a vertical distance between the wearable apparatus and the one remote wireless apparatus; and
causing performance of the active scan for the one remote wireless apparatus or the third apparatus associated with the one remote wireless apparatus if a) it is determined that the orientation of the wearable apparatus with respect to the one remote wireless apparatus satisfies at least one predetermined condition and b) the vertical distance is indicative of the wearable and one remote wireless apparatuses being on the same floor.

8. The method of claim 1,
wherein each of the one or more received radio frequency positioning packets includes an identifier of a respective one of the one or more remote wireless apparatus that transmitted a respective one of the one or more received radio frequency positioning packets, the method further comprising:
determining by the wearable apparatus, whether an identifier of a respective one of the one or more remote wireless apparatuses in a respective one of the one or more received positioning packets, is on a white-list, wherein an active scan is permitted for the respective one of the one or more remote wireless apparatuses if its identifier is on the white list.

9. A wearable apparatus comprising:
at least one processor; and
at least one memory storing instructions that, when executed by the at least one processor, cause the wearable apparatus at least to:
receive one or more radio frequency positioning packets by a wearable apparatus worn by a user, from a corresponding one or more remote wireless apparatuses, using a phased array of antennas forming part of the wearable apparatus;
determine an orientation of the wearable apparatus with respect to one remote wireless apparatus of the one or more remote wireless apparatuses based on at least one received radio frequency positioning packet of the received one or more radio frequency positioning packets;
determine a gaze direction of the user's eye movement using at least one retina detector forming part of the wearable apparatus, while looking from the wearable apparatus toward the one remote wireless apparatus;
determine an occurrence of a predetermined relationship that the orientation is indicative of a bearing towards the one remote wireless apparatus being aligned with the gaze direction; and
transmit to a portable communications device, using a transmitter forming part of the wearable apparatus, a message for the portable communications device to transmit a wireless active scan request packet to the one remote wireless apparatus for performance of an active scan for the one remote wireless apparatus or a third apparatus associated with the one remote wireless apparatus, in response to the determination of the predetermined relationship.

10. The apparatus of claim 9, wherein the active scan is performed using an identifier of the one remote wireless apparatus or the third apparatus that is included in a radio frequency packet received from the one remote wireless apparatus.

11. The apparatus of claim 9, wherein the computer program code, when executed by the at least one processor, causes the apparatus to cause performance of the active scan at least by causing the one remote wireless apparatus or the third apparatus to be added an active scan white list.

12. The apparatus of claim 9, wherein the computer program code, when executed by the at least one processor, causes the apparatus to:
determine a direction of a gesture performed by the user; and
determine that the orientation of the wearable apparatus with respect to the one remote wireless apparatus satisfies the predetermined condition if the direction of the gesture of the user and the orientation of the wearable apparatus with respect to the one remote wireless apparatus adopt a predetermined relationship.

13. The apparatus of claim 9, wherein the computer program code, when executed by the at least one processor, causes the apparatus to:

cause performance of the active scan if at least one further pre-determined condition with respect to the one remote wireless apparatus or the third apparatus is also satisfied, and at least one of:
a) determine whether a user indication that a connection with the one remote wireless apparatus or the third apparatus is desired has been received and cause performance of the active scan if the user indication has been received, or
b) estimate a distance between the wearable and one remote wireless apparatuses and causing performance of the active scan, if the estimated distance satisfies a pre-determined criterion, or the estimated distance satisfies the pre-determined criterion if the estimated distance is less than a threshold distance, or
c) determine a received signal strength indication for at least one radio frequency packet received from the one remote wireless apparatus and cause performance of the active scan, if the received signal strength indication is determined to be above a threshold value.

14. The apparatus of claim 13, wherein the computer program code, when executed by the at least one processor, causes the apparatus to:
determine a type of the one remote wireless apparatus or the third apparatus; and
cause performance of the active scan, if the apparatus is determined to be of a pre-defined type.

15. The apparatus of claim 9, wherein the computer program code, when executed by the at least one processor, causes the apparatus to:
determine a vertical distance between the wearable apparatus and the one remote wireless apparatus; and
cause performance of the active scan for the one remote wireless apparatus or the third apparatus associated with the one remote wireless apparatus if a) it is determined that the orientation of the wearable apparatus with respect to the one remote wireless apparatus satisfies at least one predetermined condition and b) the vertical distance is indicative of the wearable and one remote wireless apparatuses being on the same floor.

16. A non-transitory computer-readable medium comprising program instructions stored thereon for performing at least the following:
receiving by a wearable apparatus, one or more radio frequency positioning packets by a wearable apparatus worn by a user, from a corresponding one or more remote wireless apparatuses, using a phased array of antennas forming part of the wearable apparatus;
determining by the wearable apparatus, an orientation of the wearable apparatus with respect to one remote wireless apparatus of the one or more remote wireless apparatuses based on at least one received radio frequency positioning packet of the received one or more radio frequency positioning packets;
determining by the wearable apparatus, a gaze direction of the user's eye movement using at least one retina detector forming part of the wearable apparatus, while looking from the wearable apparatus toward the one remote wireless apparatus;
determining by the wearable apparatus, an occurrence of a predetermined relationship that the orientation is indicative of a bearing towards the one remote wireless apparatus being aligned with the gaze direction;
transmitting to a portable communications device, using a transmitter forming part of the wearable apparatus, a message for the portable communications device to transmit a wireless active scan request packet to the one remote wireless apparatus for performance of an active scan for the one remote wireless apparatus or a third apparatus associated with the one remote wireless apparatus, in response to the determination of the predetermined relationship.

* * * * *